(12) United States Patent
Faisal et al.

(10) Patent No.: US 7,895,346 B2
(45) Date of Patent: Feb. 22, 2011

(54) APPLICATION LEVEL ROUTER FOR ROUTING HETEROGENEOUS INPUT TO THE MOST APPROPRIATE APPLICATION

(75) Inventors: Adil Faisal, Redmond, WA (US); Shruti Kasetty, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 351 days.

(21) Appl. No.: 11/800,835

(22) Filed: May 8, 2007

(65) Prior Publication Data

US 2008/0279197 A1  Nov. 13, 2008

(51) Int. Cl.
*G06F 15/16* (2006.01)

(52) U.S. Cl. .................. 709/230; 719/318; 719/328; 717/174

(58) Field of Classification Search .................. 709/202, 709/203, 238, 230; 719/318, 320, 328; 370/396; 717/174
See application file for complete search history.

(56) References Cited

U.S. PATENT DOCUMENTS

| | | | |
|---|---|---|---|
| 5,974,085 A * | 10/1999 | Smith | 375/222 |
| 6,449,646 B1 | 9/2002 | Sikora et al. | |
| 6,526,581 B1 | 2/2003 | Edson | |
| 6,556,671 B1 | 4/2003 | Beauvois | |
| 6,640,239 B1 | 10/2003 | Gidwani | |
| 6,798,772 B2 | 9/2004 | Bergman et al. | |
| 7,035,935 B1 | 4/2006 | Voois et al. | |
| 7,114,004 B2 | 9/2006 | El-Gazzar et al. | |
| 7,203,681 B1 * | 4/2007 | Arnold et al. | 707/7 |
| 7,376,696 B2 * | 5/2008 | Bell et al. | 709/203 |
| 7,472,195 B2 * | 12/2008 | Burckart et al. | 709/228 |
| 2002/0085701 A1 | 7/2002 | Parsons et al. | |
| 2003/0093572 A1 * | 5/2003 | Laux et al. | 709/250 |
| 2004/0019696 A1 * | 1/2004 | Scott et al. | 709/242 |
| 2004/0059776 A1 * | 3/2004 | Pitzel et al. | 709/203 |
| 2004/0068567 A1 * | 4/2004 | Moran et al. | 709/227 |
| 2004/0111642 A1 * | 6/2004 | Peles | 713/201 |
| 2004/0179092 A1 | 9/2004 | LaPoint | |
| 2005/0141522 A1 | 6/2005 | Kadar et al. | |
| 2006/0112188 A1 * | 5/2006 | Albanese et al. | 709/238 |
| 2007/0240098 A1 * | 10/2007 | Averett et al. | 717/104 |
| 2008/0168474 A1 * | 7/2008 | Jeon et al. | 719/320 |
| 2008/0276254 A1 * | 11/2008 | Lapuyade | 719/318 |

OTHER PUBLICATIONS

"Cisco Enhanced Conferencing and Transcoding for Voice Gateway Routers", http://www.cisco.com/application/pdf/en/us/guest/products/ps5854/c1167/cdccont_0900aecd8016c2c7.pdf, 2005.
"Cisco Unified Communications Manager Express 4.1", http://www.cisco.com/application/pdf/en/us/guest/products/ps4625/c1650/cdccont_0900aecd805e1alf.pdf, 2007.

* cited by examiner

Primary Examiner—David Lazaro

(57) ABSTRACT

A client-agnostic software routing component for routing input data of a type and version to a most appropriate type and version of client application of a family of related applications. The router, rather than the client application, registers as the file extension handler and as the protocol handler, and thus, receives all input data targeting the client applications. On startup, the router creates a list of available client applications, the client versions and types, and versions of input data the clients can handle. On receiving the input, the router determines if the router can parse the version of the input. The router refers to the list of available clients to determine if one or more of the client applications can handle a particular version and type of the input data. After this determination, the router routes the input to the most appropriate client.

20 Claims, 13 Drawing Sheets

APPLICATION LEVEL ROUTER FOR ROUTING HETEROGENEOUS INPUT TO THE MOST APPROPRIATE APPLICATION

BACKGROUND

For distributed applications, versioning and upgrading of the server often result in the need to have multiple clients in the user machine. For example, one physical machine can have multiple types of the communications clients (e.g., e-mail, instant messaging, and realtime communications clients) and additionally, there can be multiple versions of the same client application.

The client applications need to handle many different types of data to either support different functionalities and/or to communicate with different versions or types of servers. All of these heterogeneous kinds of input data need to be processed locally to ensure reaching the correct client application and eventually to enable the client application to communicate with the correct server and provide the desired functionality to the user.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides a client-agnostic software routing component for the routing of input data of a type and version to the most appropriate type and version of client application. The router component can be bundled with each client application that desires access to the router service such that the router component installs as part of the client application installation process.

During installation, the router, rather than the client application, registers as the file extension handler and as the protocol handler. As the file extension handler and/or protocol handler, the router receives all the input data targeting the client applications.

The router can be installed as a shared component. Since the router can be installed as a shared component at a location shared by the client applications, router upgrades can be automatically guaranteed with the installation of new client applications. The router will be uninstalled with the uninstallation of the last client application.

Depending on the access level of user installing the router, there can be more than one router installed in a machine. This happens in case the router is installed by an administrator and a non-administrator on the same machine. However, during operation, only one of these routers will be responsible for routing.

On startup, the router creates a list of available client applications, the client versions and types, and versions of input data the clients can handle. The router also creates a list of other routers (if any) in the machine. On receiving the input, the router will first determine if the router can parse the particular version of the input. The router parses the input and refers to the list of available clients to determine if one or more of the client applications can handle a particular version and type of the input data.

In one implementation, to ensure that the input data is consistently (e.g., always) handled by the latest version of the router, a forwarding mechanism is provided internal or external to the router, whereby the router can forward the input data to another router (e.g., a newer version of the router).

In another implementation, the router can communicate with an external, trusted entity to verify the origin of the input data. This can be used to guarantee the origin of the input data for the client, irrespective of the data origin.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
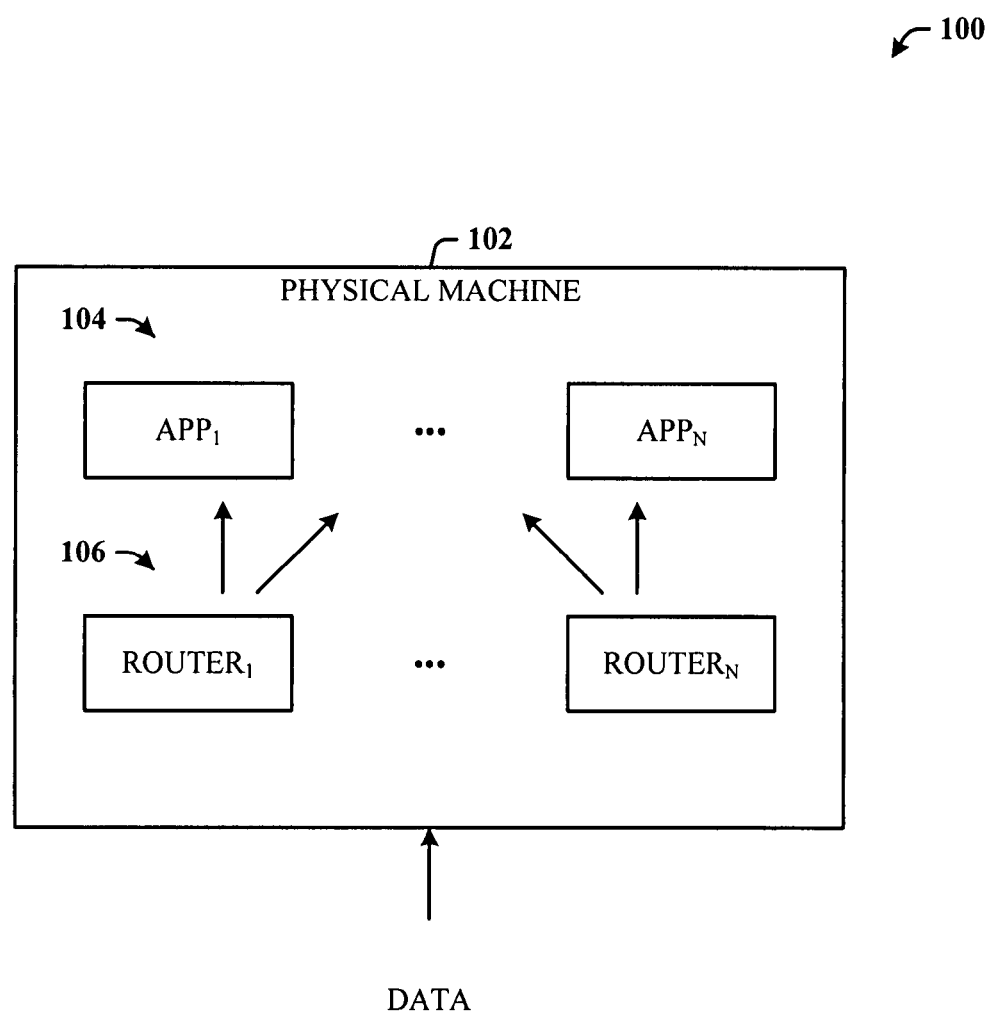
FIG. 1 illustrates a computer-implemented system for data handling.

The disclosed architecture includes a client-agnostic routing layer for the routing of input data to a most appropriate type and version of client application. The router can be installed as part of a client application, and registers with the machine operating system as the file extension handler and as the protocol handler rather than of the client application. Accordingly, the router receives all the input data targeting the client applications. The router design is such that the router can easily be extended to support routing of input to a family of client applications, using the same file extension (e.g., MIME-multi-purpose mail extensions) or a single protocol.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented system 100 for data handling. The system 100 includes a physical machine 102 (e.g., a computer) on which multiple co-existing client applications 104 (denoted $APP_1, \ldots, APP_N$, where N is a positive integer) of different types and versions can be installed. The system 100 also includes a plurality of routers 106 (denoted $ROUTER_1, \ldots, ROUTER_N$), each router associated with one or more of the applications for receiving and routing data received by the system 100 to an appropriate application.

Figure 2:
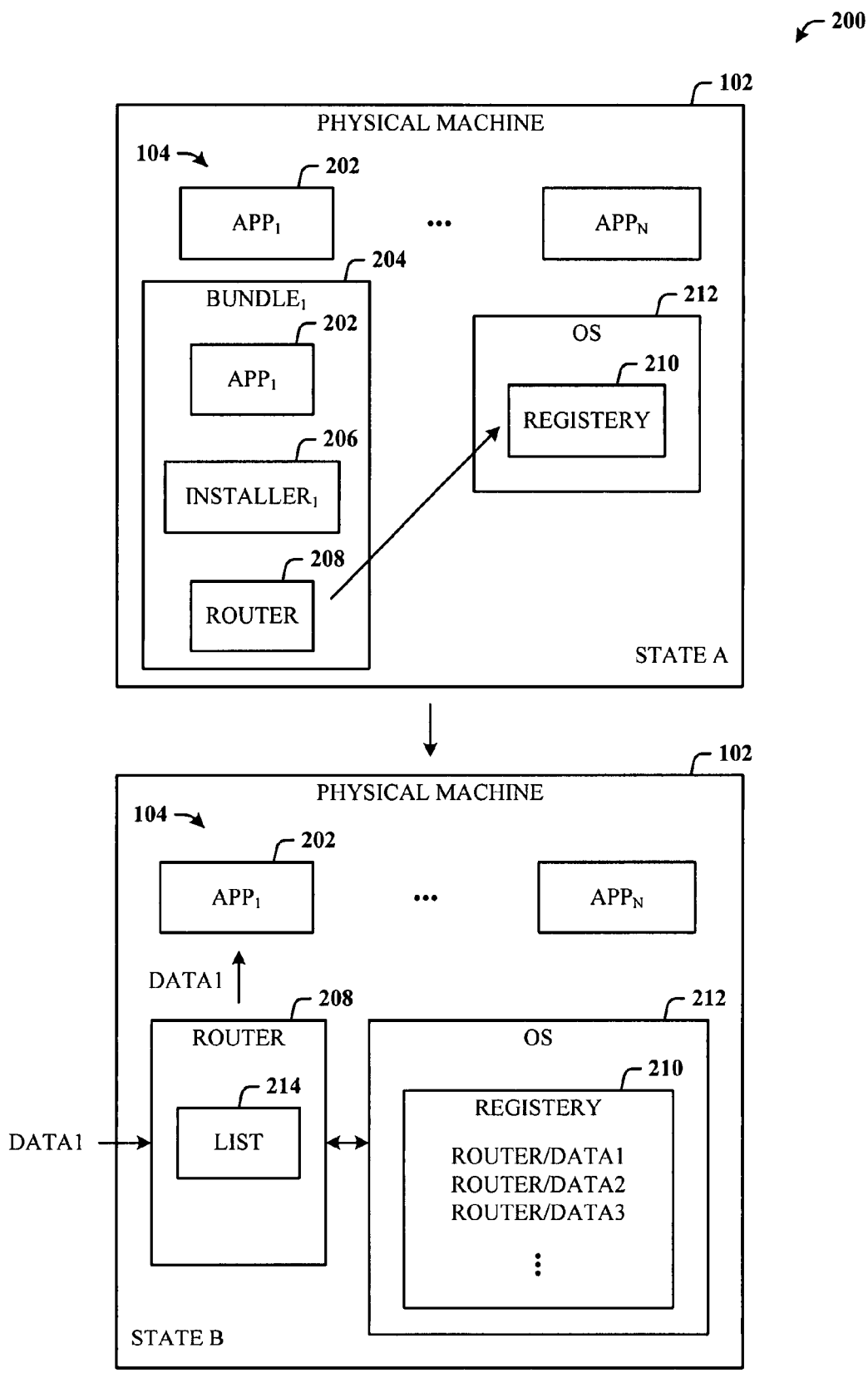
FIG. 2 illustrates an alternative system for handling input data.

FIG. 2 illustrates an alternative system 200 for handling input data. The system 200 shows the machine 102, on which a first application 202 (denoted $APP_1$) of the multiple applications 104 is to be installed, in two states: a first state designated State A, and a second state designated State B. Note that although depicted as already being part of the machine 102, the multiple applications 104 represent that some of the applications 104 may already installed, or will eventually to be installed.

As one example of providing the routing (or data handling) capability described herein, a first application bundle 204 (denoted $BUNDLE_1$) to be installed is distributed with an installer 206 that installs the first application 202 and a router 208, as indicated in State A. The router 208 can be bundled with every client application that needs access to the router's service and can be installed by the client application.

During the installation process, rather than the first application 202 registering with a registry 210 of an operating system (OS) 212, the installer 206 registers the router 208. Accordingly, data entering the machine 102 will be processed first by the router 208 for redirection to the most appropriate application of the client applications 104. In other words, the router 208 is provided with file extension handling and/or protocol handling capability. In one more specific implementation, the router 208, instead of the client, registers as the MIME type handler (e.g., handler of .rtc) and as the protocol handler (e.g., handler of meet:). As the MIME type handler or protocol handler, the router 208 receives all the input data targeting the client applications 104.

Thus, the data received at the machine 102 will first be processed according to the registry for handling by the router 208, for routing to one or more of the client applications 104, and not restricted to the first application 202, even though the router 208 was installed with the first application 202.

As indicated in machine State B, after the router 208 is installed (as well as the first application 202, although the router 208 could be installed without installing the first application 202), the router 208 scans the machine 102 for the client applications 104, application types, and application versions, other routers and router versions (if any), and creates a list 214 of this information. The list 214 can also include availability data related to available client applications, the available client application types, and available application versions at startup. As indicated in the registry 210, the router 208 becomes associated with different data types, for example, DATA1, DATA2, DATA3, . . . In State B, the machine 102 depicts only the single router 208 and the data relationships in the registry 210. However, as will be described infra, there can be multiple routers, and hence, multiple router/data relationships in the registry 210.

In this example, the input data (DATA1) will be processed by the router 208 and routed to the most appropriate client application of the client applications 104, the first application 202. Note, however, that the router 208 receives all data for the client applications 104 that require the routing service.

The router 208 parses the input data (DATA1) received by the system (or machine 102) based on a data version. On receiving the input, the router 208 first checks to determine if the particular version of the input data can be parsed by the router 208. The router 208 parses the input data and refers to its list 214 of available clients to determine if one or more of the client applications 104 can handle this particular version and type of the input data, and then routes the data to the most appropriate client application. The router 208 can be uninstalled using the installer 206, for example, with the uninstallation of the last client application (denoted $APP_N$).

Figure 3:
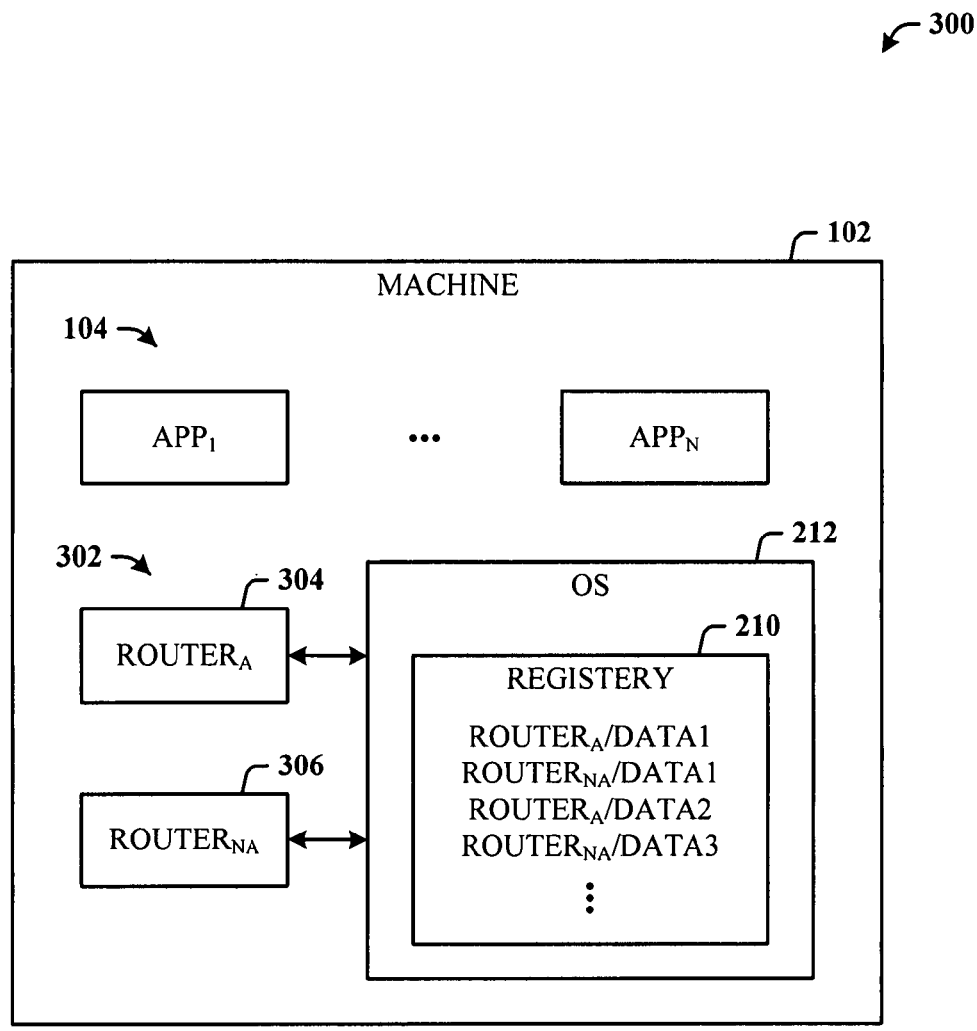
FIG. 3 illustrates an alternative implementation of a system that employs an installation of multiple routers.

FIG. 3 illustrates an alternative implementation of a system 300 that employs an installation of multiple routers 302. The system 300 includes the machine 102 where the installed routers 302 include both an administrative installation 304 (denoted $ROUTER_A$) in accordance with an administrator-level install and a non-administrative installation 306 (denoted $ROUTER_{NA}$) in accordance with a general user-level install. The routers 302 are registered with the registry 210, instead of the applications 104 that have been installed with the routers 302. Thus, all data for the associated applications 104 is routed through the routers 302, first. The registry 210 can include data associations for the administrator and non-administrator level installations. As depicted, the registry 210 includes relationships such as an administrator install of the administrator router 304 associated with both DATA1 and DATA2, administrator and non-administrator level routers 302 associated with the same DATA1, a non-administrator level install of the router 306 with a separate DATA3, and so on.

The routers 302 can be installed as shared components. In one implementation, there can be at most two routers installed in the machine 102 (one installed by administrator and the other installed by the non-administrative user). Additionally, since the router (304 or 306) is installed as a shared component at a location shared by the clients 104, upgrading of the routers 302 can be automatically guaranteed with the installation of new client applications 104.

Figure 4:
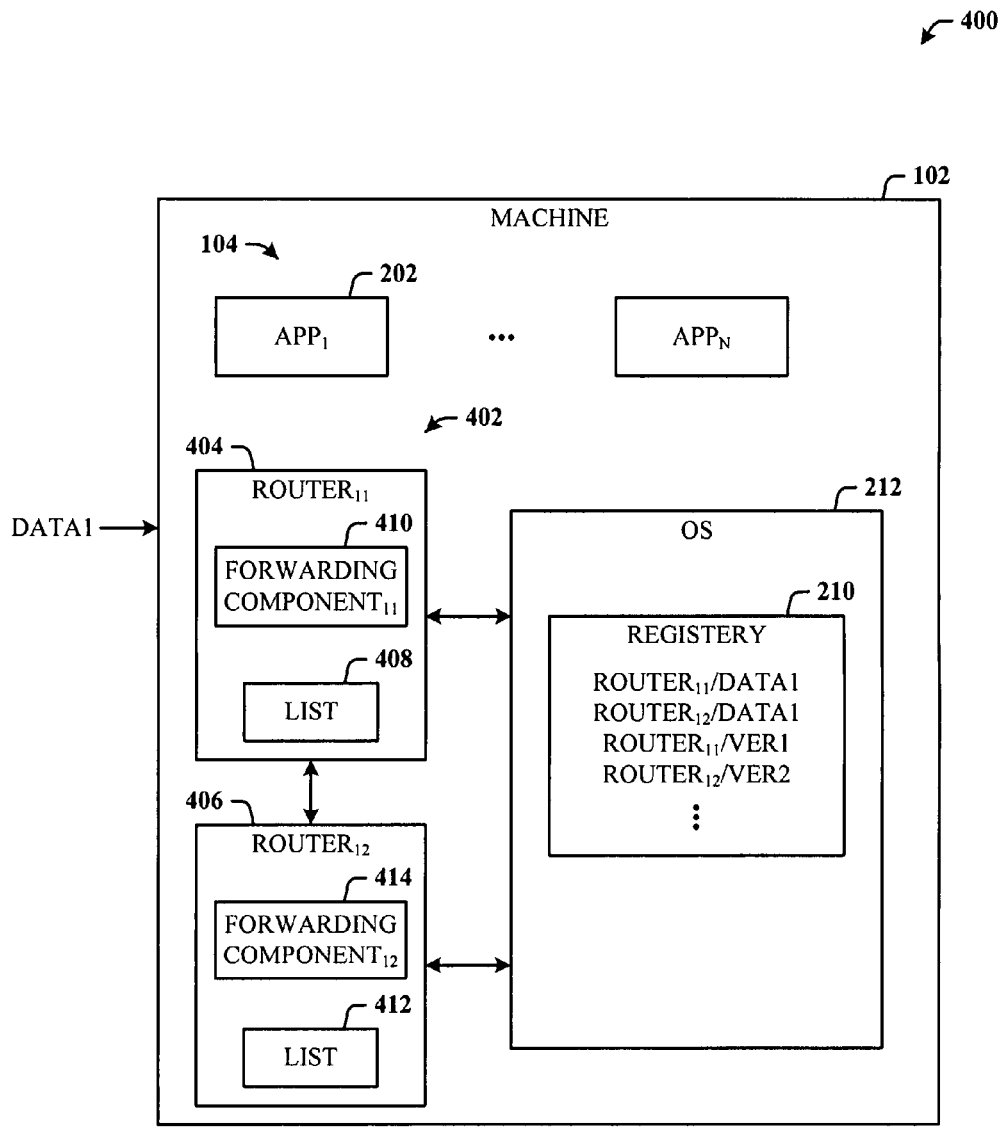
FIG. 4 illustrates data handling when multiple versions of a router are employed.

FIG. 4 illustrates data handling when multiple versions of a router are employed. Here, the machine 102 employs two routers 402: a first router 404 of an earlier version (denoted $ROUTER_{11}$), and a second router 406 of a later version (denoted $ROUTER_{12}$). Each of the routers 402 can include a list and a forwarding component. For example, the first router 404 can include a first router list 408 that tracks available applications, application versions, data input types and versions handled by the applications, and other routers (e.g., the second router 406). Additionally, the first router 404 can include a first router forwarding component 410 for forwarding input data to the latest version of the router, for example, the second router 406.

Similarly, the second router 406 can include a second router list 412 that tracks available applications, application versions, data input types and versions handled by the applications, and other routers (e.g., the first router 404). Additionally, the second router 406 can include a second router forwarding component 414 for forwarding input data to the earlier version of the router, for example, the first router 404.

To follow this implementation, the registry 210 of the OS 212 reflects that the first router 404 and second router 406 can be associated with DATA1, the first router ($ROUTER_{11}$) can be associated with a first version (VER1) and the second router ($ROUTER_{12}$) can be associated with a second version (VER2). Accordingly, DATA1 received as input data into the machine 102 can be received by the first router 404, but will be forwarded by the first router forwarding component 410 to the second router 406, based on a routing policy that routes data to the later version router. Ultimately, the input data DATA1 can be routed to the first application 202.

In other words, to ensure that the input data is consistently handled by the latest version of the router (or the desired version, which can be an earlier version), the internal forwarding component is provided such that the router can forward the input data to another version (e.g., newer) of the router. This can follow a postulation that the latest version of the router knows most about routing policy and is best suited to handle the input.

Figure 5:
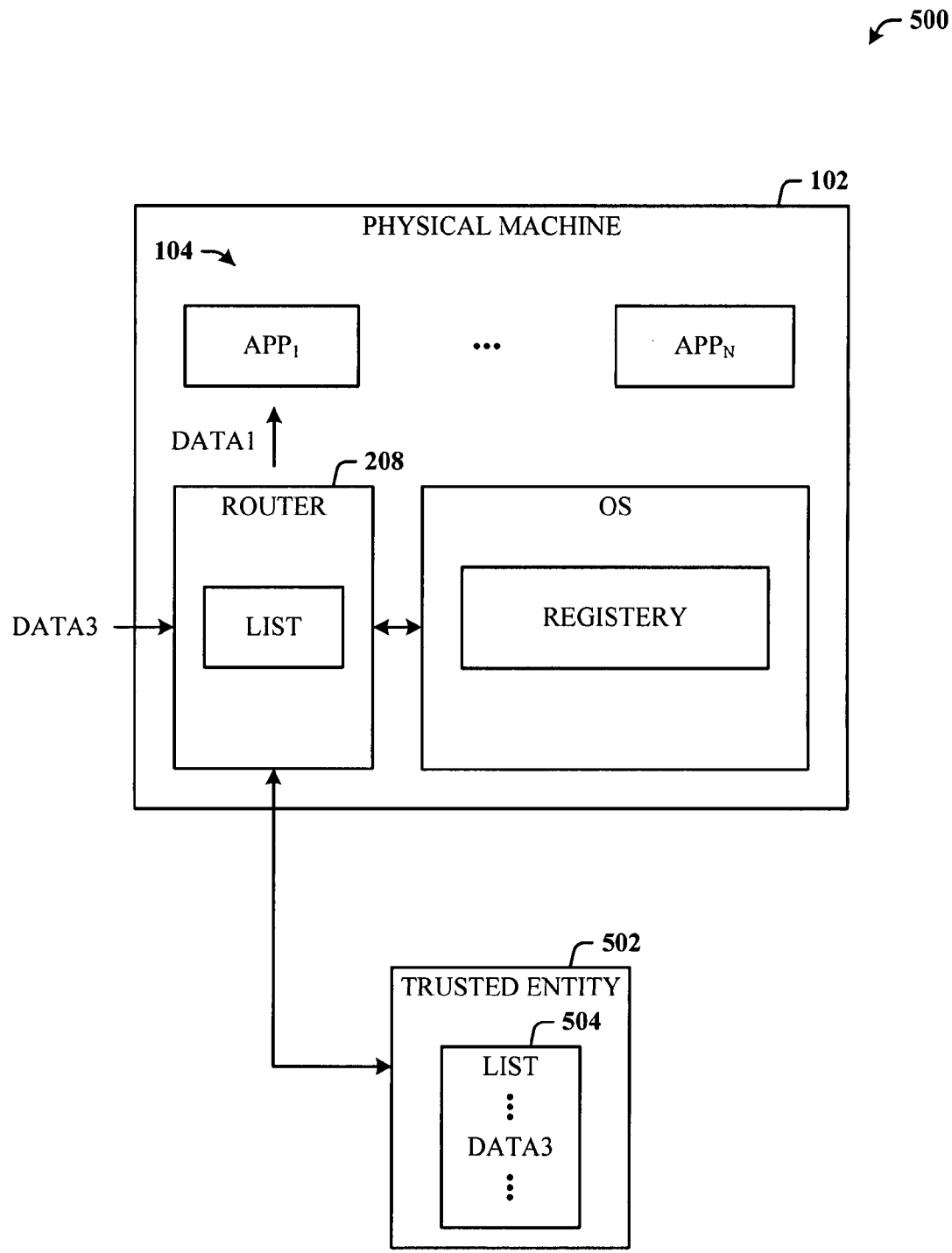
FIG. 5 illustrates a system where a router can communicate with an external trusted entity for verification of input data.

FIG. 5 illustrates a system 500 where a router can communicate with an external trusted entity 502 (e.g., a "Home" server) for verification of input data. The machine 102 receives input data DATA3. Prior to continued receipt, processing, or during an interim storing of the input data DATA3, the router 208 can communicate with the external, trusted entity 502 to verify the origin of the input data. This can be referred to as a "Call Home" feature, which is a general mechanism whereby a client (the machine 102) can obtain a guarantee of the origin of the input data, irrespective of data origin (e.g., a server or service). The trusted entity 502 can include a list 504 of trusted data, which when compared with the input data DATA3, indicates that the DATA3 is verified data and can be accepted into the machine 102 for further processing by one or more of the applications 104.

Figure 6:
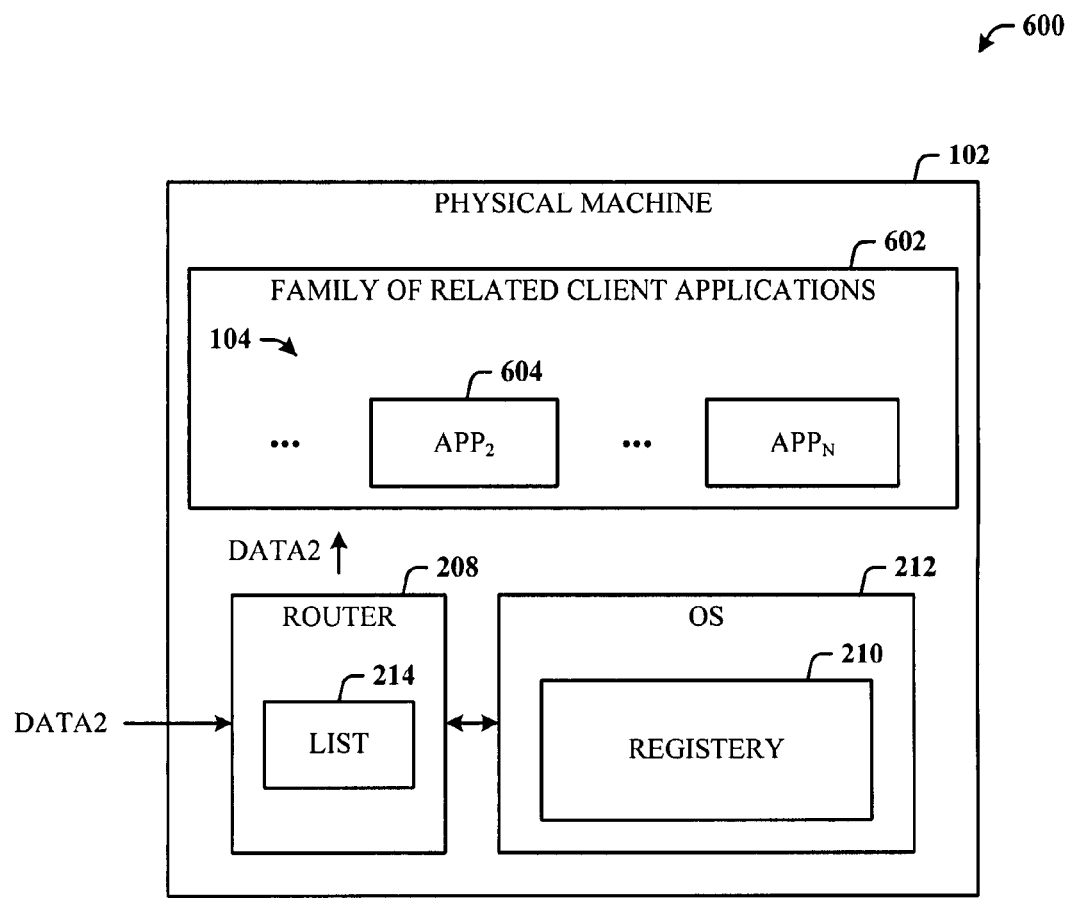
FIG. 6 illustrates a system where a family of related applications is utilized for router data handling.

FIG. 6 illustrates a system 600 where a family of related applications 602 is utilized for router data handling. During installation as part of the one of the applications 104, the router 208 registers with the registry 210 of the OS 212. Upon startup, the router 208 compiles the list 214 of available applications 104, other routers, application versions and types, and so on, which list 214 includes a second application 604. Here, the machine 102 receives input data DATA2 into the router 208. The router processes the input data DATA2 as being associated with the application type and version for the second application 604, and thereafter routes the input data DATA2 to the second application 604. As can be seen, the router 208 can easily be extended to support routing of input data to a family of clients (e.g., communications) using a same MIME type extension (e.g., .ucg) or a single protocol (e.g., conf: or meet: or comm:).

Figure 7:
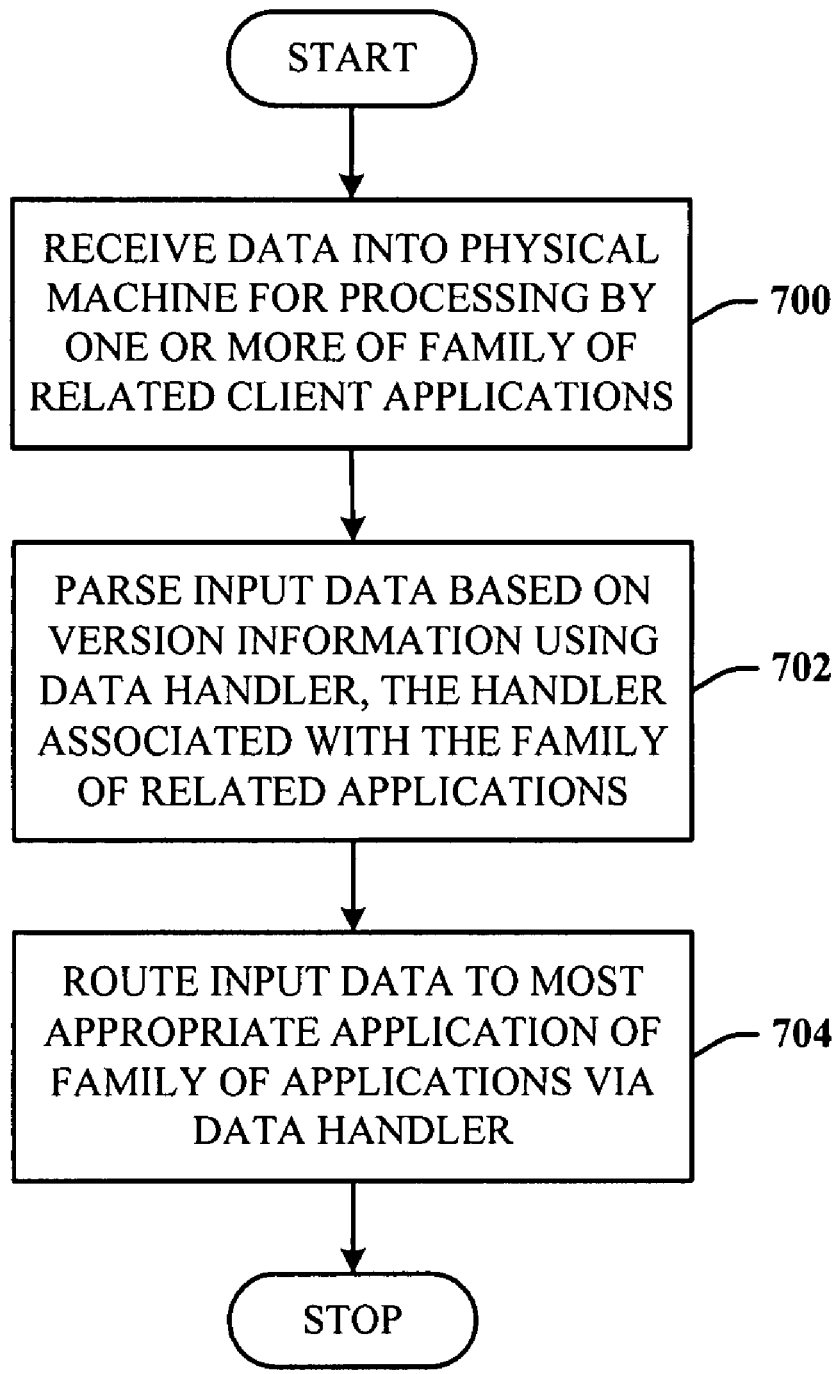
FIG. 7 illustrates a method of data handling via a router.

FIG. 7 illustrates a method of data handling via a router. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 700, input data is received into a physical machine for processing by one or more applications of a family of related client applications. At 702, the input data is parsed based on version information using a data handler (e.g., a router), the handler associated with the family of applications. At 704, the input data is then routed to the most appropriate application of the family of applications via the data handler.

Figure 8:
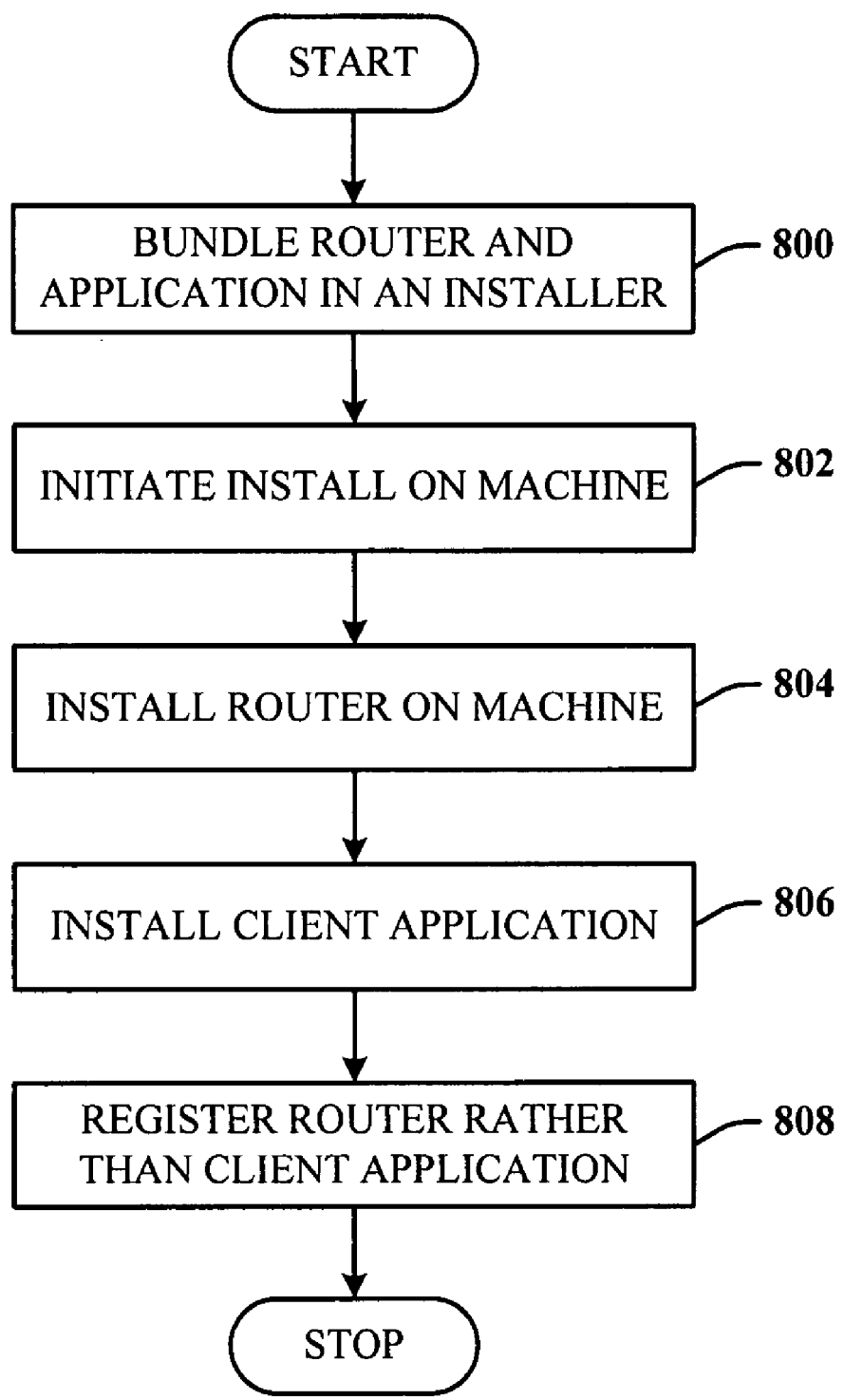
FIG. 8 illustrates a method of installing and registering the router.

FIG. 8 illustrates a method of installing and registering the router. At 800, the router and application are bundled in an installer. At 802, the install process is initiated. At 804, the router is installed. At 806, the client is installed. At 808, the router is registered with the operating system registry rather than the client, as the data handler for certain data types and versions. Note that the order of install is not determinative of whether the client or the router registers with the registry.

Figure 9:
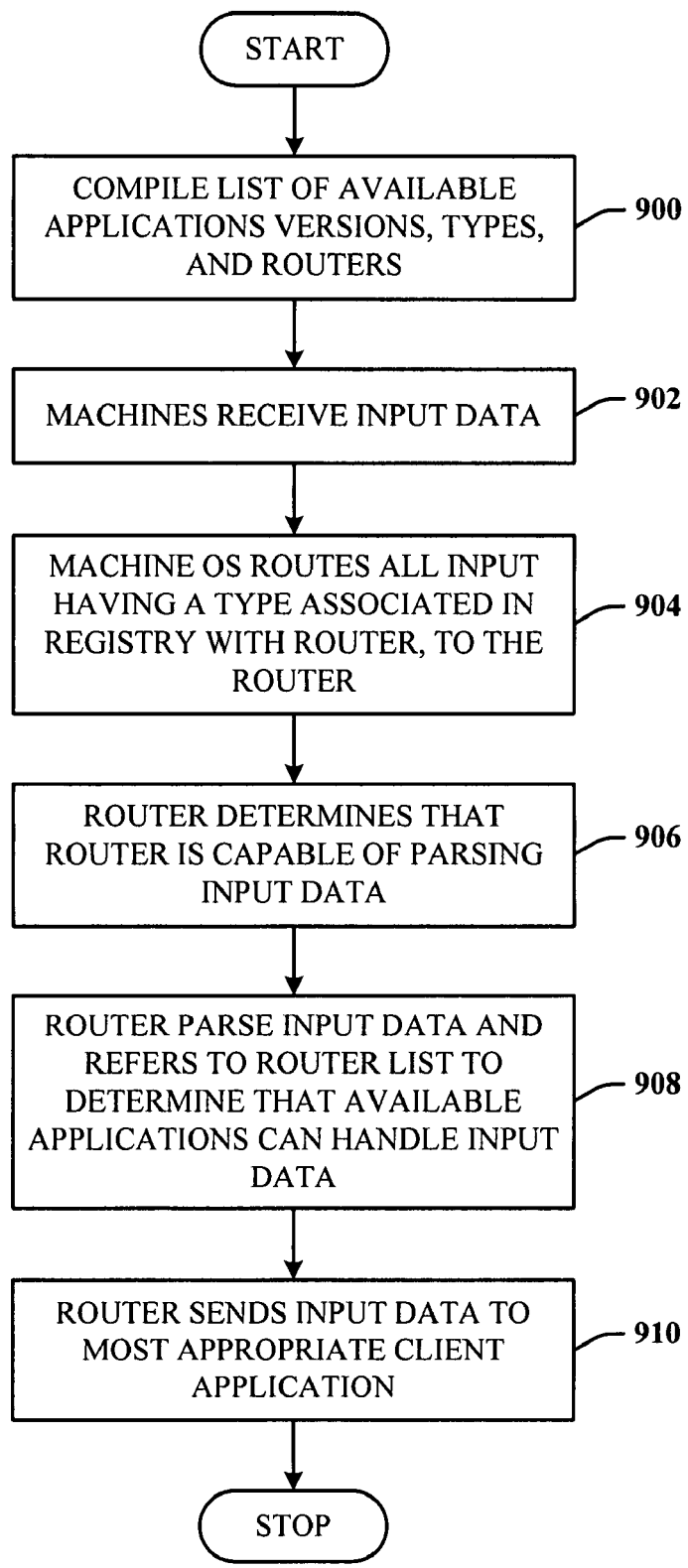
FIG. 9 illustrates a method of data processing by the router.

FIG. 9 illustrates a method of data processing by the router. At 900, a list of available applications and other routers is compiled. At 902, the machine receives input data. At 904, the machine operating system routes all input having a type associated in the registry with the router, to the router. As the file extension and/or protocol handler, all related client applications data is routed to the router. At 906, the router determines that the router is capable of parsing the input data. At 908, the router parses the input data and refers to the router list to determine if the available client applications can process the input data version and type. If so, the input data is sent to the most appropriate client application, as indicated at 910.

Figure 10:
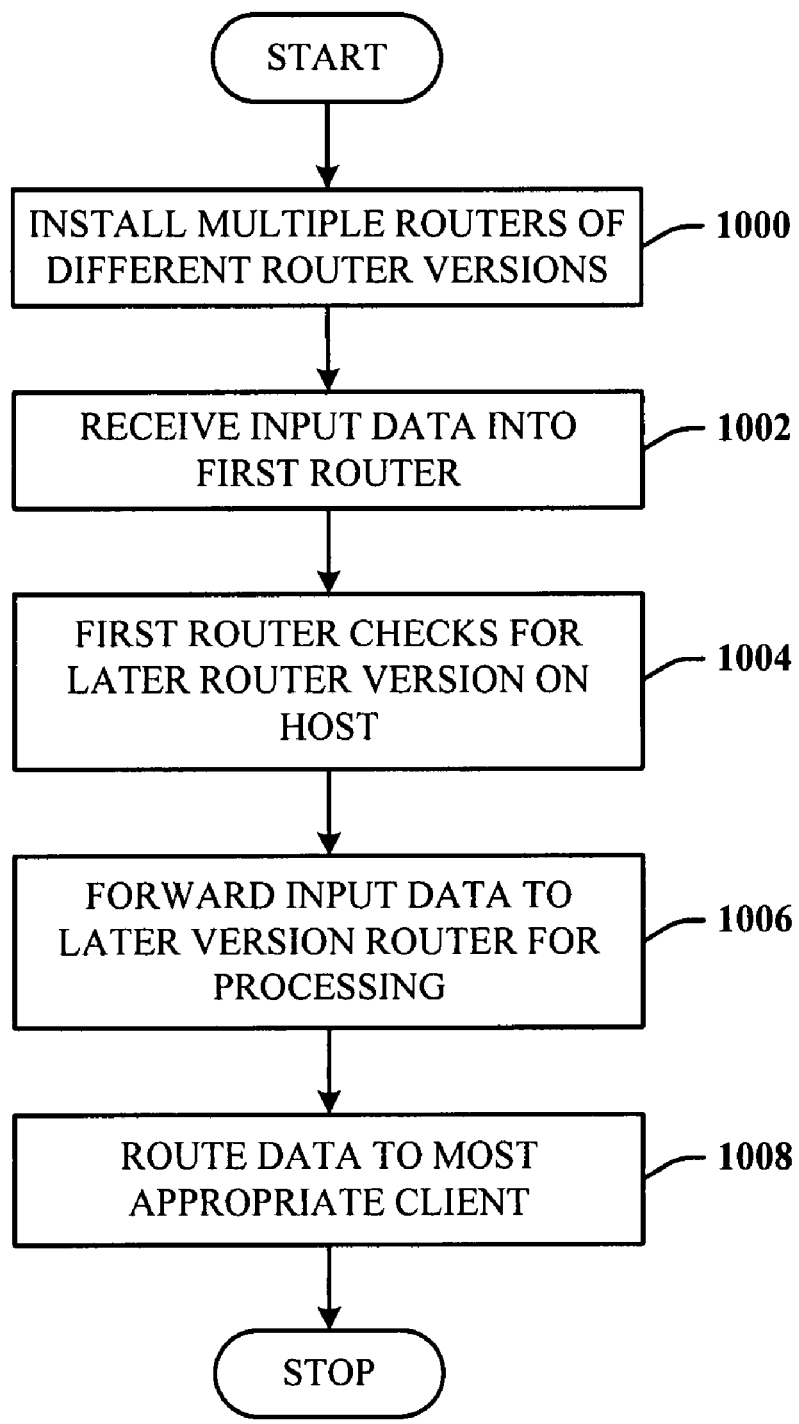
FIG. 10 illustrates a method of processing input data relative to multiple router versions.

FIG. 10 illustrates a method of processing input data relative to multiple router versions. At 1000, multiple routers of different versions are installed. At 1002, input data is received into a first router. At 1004, the first router checks for a later version router. At 1006, the input data is forwarded to the later version router for processing. At 1008, the input data is routed to the most appropriate client application.

Figure 11:
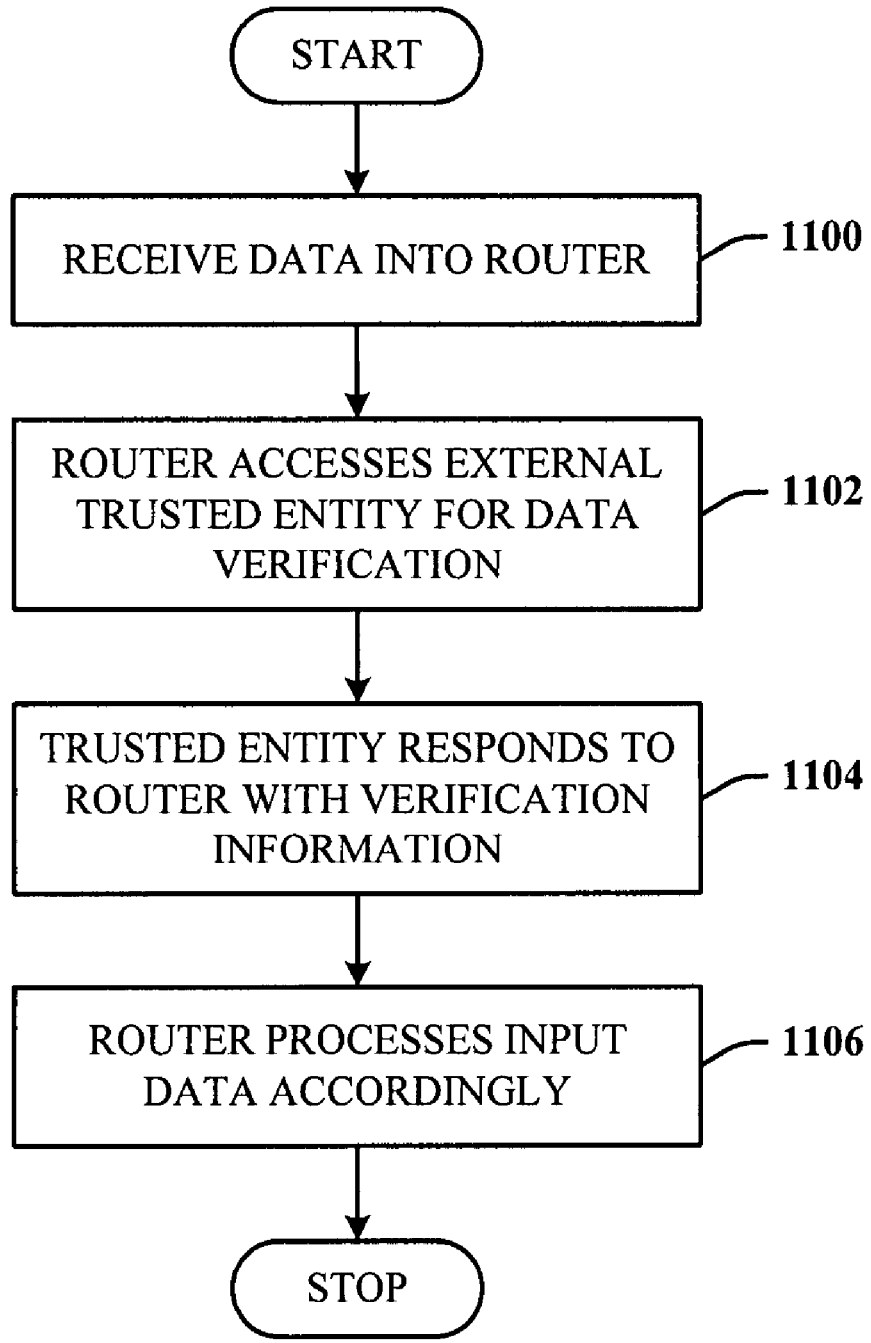
FIG. 11 illustrates a method of verifying input data for router processing.

FIG. 11 illustrates a method of verifying input data for router processing. At 1100, input data is received by the router for processing. At 1102, the router responds by accessing an external trusted entity for verification of the data. At 1104, the trusted entity responds to the router with verification information. At 1106, the router processes the input data accordingly. For example, if verified, the data will be processed through to the most appropriate application. If not verified the data can be discarded.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 12:
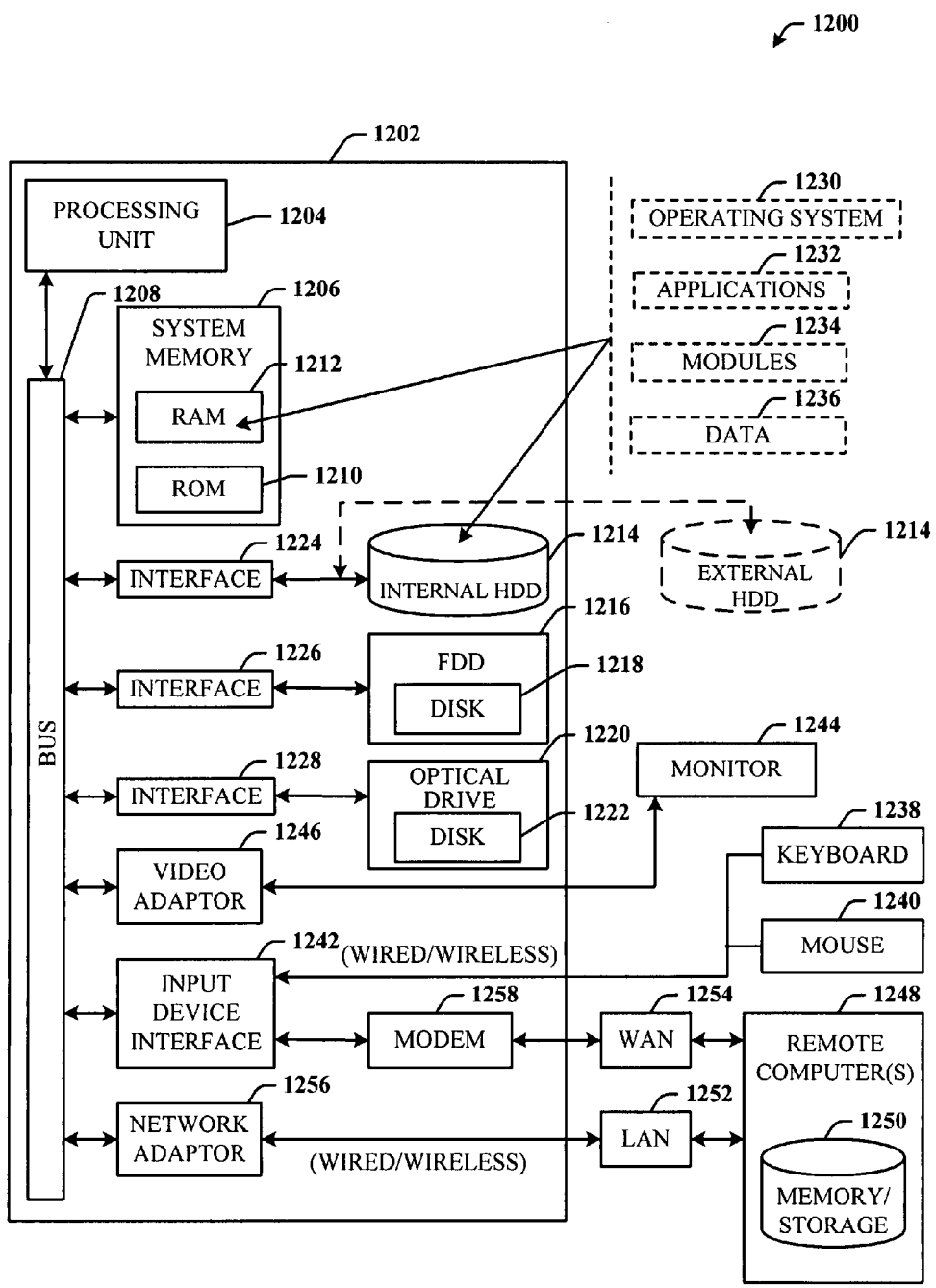
FIG. 12 illustrates a block diagram of a computing system operable to execute data handling in accordance with the disclosed architecture.

Referring now to FIG. 12, there is illustrated a block diagram of a computing system 1200 operable to execute data handling in accordance with the disclosed architecture. In order to provide additional context for various aspects thereof, FIG. 12 and the following discussion are intended to provide a brief, general description of a suitable computing system 1200 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 12, the exemplary computing system 1200 for implementing various aspects includes a computer 1202, the computer 1202 including a processing unit 1204, a system memory 1206 and a system bus 1208. The system bus 1208 provides an interface for system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 1212, including an operating system 1230, one or more application programs 1232, other program modules 1234 and program data 1236. The operating system 1230 can include the OS 212, the one or more application programs 1232, other program modules 1234, and program data 1236 can include the client applications 104, the routers 106, the bundle 204, the registry 210, the router 208, the routers 302, the routers 402, and the family of applications 602, for example.

All or portions of the operating system, applications, modules, and/or data can also be cached in the RAM 1212. It is to be appreciated that the disclosed architecture can be implemented with various commercially available operating systems or combinations of operating systems.

A user can enter commands and information into the computer 1202 through one or more wire/wireless input devices, for example, a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wire and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wire/wireless connectivity to a local area network (LAN) 1252 and/or larger networks, for example, a wide area network (WAN) 1254. Such LAN and WAN networking environments are commonplace in offices and companies, and facilitate enterprise-wide computer networks, such as intranets, all of which may connect to a global communications network, for example, the Internet.

When used in a LAN networking environment, the computer 1202 is connected to the local network 1252 through a wire and/or wireless communication network interface or adaptor 1256. The adaptor 1256 may facilitate wire or wireless communication to the LAN 1252, which may also include a wireless access point disposed thereon for communicating with the wireless adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wire and/or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, for example, computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3 or Ethernet).

Figure 13:
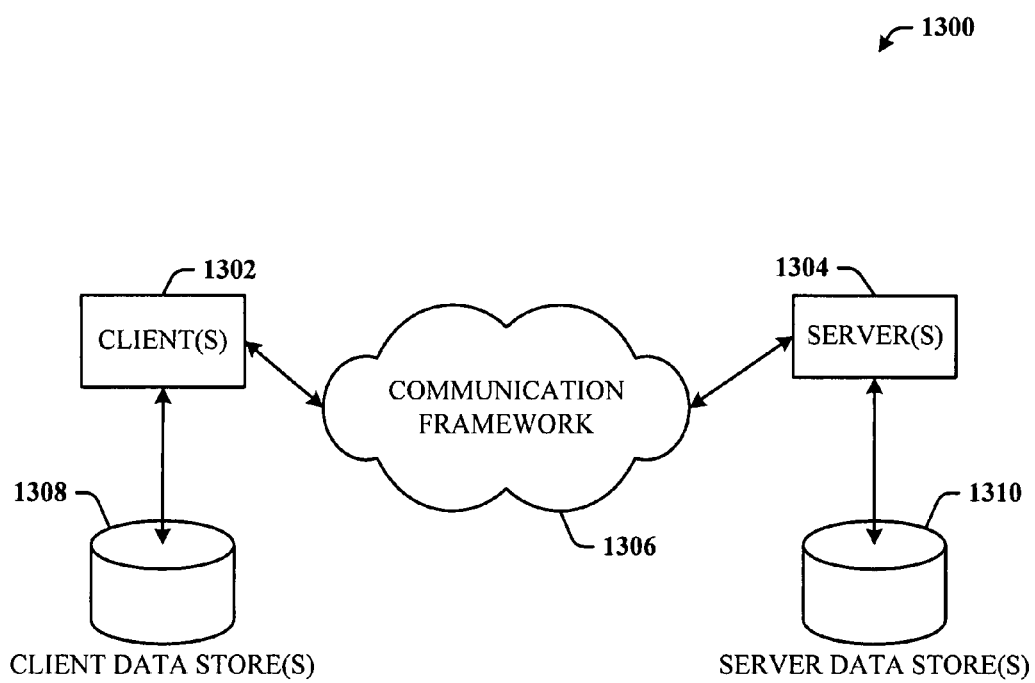
FIG. 13 illustrates a schematic block diagram of an exemplary computing environment for data routing/handling in accordance with the disclosed architecture.

Referring now to FIG. 13, there is illustrated a schematic block diagram of an exemplary computing environment 1300 for data routing/handling in accordance with the disclosed architecture. The system 1300 includes one or more client(s) 1302. The client(s) 1302 can be hardware and/or software (e.g., threads, processes, computing devices). The client(s) 1302 can house cookie(s) and/or associated contextual information, for example.

The system 1300 also includes one or more server(s) 1304. The server(s) 1304 can also be hardware and/or software (e.g., threads, processes, computing devices). The servers 1304 can house threads to perform transformations by employing the architecture, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wire (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304. The servers 1304 can include the trusted entity 502, and the clients 1302 can include the client applications 104, client 202, and family of applications 602, for example.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system for data handling, comprising:
   client applications of different types and versions on a physical system; and
   a router associated with the applications for routing data received by the system to an appropriate application, the router being configured to create a list of other routers of the system at startup;
   wherein the router is uninstalled with uninstallation of a last application of the client applications.

2. The system of claim 1, wherein during installation, the router registers as at least one of a file extension handler or a protocol handler.

3. The system of claim 1, wherein the router includes at least one of an administrative installation or a non-administrative installation.

4. The system of claim 1, wherein the router receives all input data for the client applications.

5. The system of claim 1, wherein the router creates a list of available client applications, available client application types, and available application versions, at startup.

6. The system of claim 5, wherein the router accesses the list to determine which of the client applications can handle a version and a type of the data.

7. The system of claim 1, wherein the router parses the data received by the system based on input data version.

8. The method of claim 1, wherein the router is installed as part of installing one or more of the client applications.

9. A computer-implemented system for data handling, comprising:
   client applications of different types and versions on a physical system;
   a router associated with the applications for routing data received by the system to an appropriate application, the router being configured to create a list of other routers of the system at startup; and
   a forwarding component for forwarding the data to another router of the system based on at least one of version or type of the data.

10. A computer-implemented method of handling data, comprising:
    receiving input data into a physical machine for processing by one or more of a family of related client applications;
    parsing the input data based on version information using a first data handler, the first data handler associated with the family of client applications;
    routing the input data to a most appropriate application using the first data handler; and
    forwarding the input data to the first data handler using a second data handler based on the first data handler being a desired version of the second data handler.

11. The method of claim 10, wherein the first data handler registers as a file extension handler and as a protocol handler of the data.

12. The method of claim 10, further comprising installing the first data handler as a shared component, the first data handler shared by the associated family of client applications.

13. The method of claim 10, further comprising installing multiple data handlers by corresponding users having different access levels.

14. The method of claim 10, further comprising communicating with a trusted external entity to verify the input data.

15. The method of claim 10, further comprising automatically updating the first data handler based on an upgraded installation of one of the client applications.

16. The method of claim 10, further comprising:
    installing the first data handler as part of installing one or more of the client applications.

17. The method of claim 10, further comprising:
    uninstalling the data handler when a last application of the client applications is uninstalled.

18. The method of claim 10, wherein forwarding the input data to the first data handler comprises:
    forwarding the input data to the first data handler using the second data handler based on the first data handler being a latest version of the second data handler.

19. A computer-implemented system, comprising:
    computer-implemented means for receiving data into a physical machine for processing by one or more of a family of related client applications;
    computer-implemented means for parsing the data based on version information using a first data handler, the first data handler associated with the family of client applications;
    computer-implemented means for routing the data to a most appropriate application of the family of related applications via the first data handler;
    computer-implemented means for forwarding the data to the first data handler using a second data handler based on the first data handler being a latest version of the second data handler; and
    computer-implemented means for uninstalling the first data handler when a last application of the client applications is uninstalled.

20. The computer-implemented system of claim 19, further comprising:
    computer-implemented means for installing the first data handler as part of installing one or more of the client applications.

* * * * *